United States Patent

Pickles

[11] 4,073,459
[45] Feb. 14, 1978

[54] SIX-WAY ADJUSTABLE SEAT SUPPORT

[75] Inventor: Joseph Pickles, Birmingham, Mich.

[73] Assignee: Ferro Manufacturing Corporation, Detroit, Mich.

[21] Appl. No.: 665,536

[22] Filed: Mar. 10, 1976

[51] Int. Cl.² ............................................ F16M 11/12
[52] U.S. Cl. ...................................... 248/394; 308/37
[58] Field of Search ................................ 248/393–396, 248/157, 419, 420, 429, 430; 308/37, 74, 163, 166, 238

[56] References Cited

U.S. PATENT DOCUMENTS

| 3,022,975 | 2/1962 | Horton et al. | 248/420 |
| 3,125,318 | 3/1964 | Lohr et al. | 248/419 |
| 3,167,297 | 1/1965 | Lohr | 248/419 |
| 3,174,715 | 3/1965 | Pickles | 248/419 |
| 3,194,615 | 7/1965 | Weasler | 308/37 |
| 3,212,747 | 10/1965 | Hansen et al. | 248/419 |
| 3,313,512 | 4/1967 | Colautti et al. | 248/419 X |
| 3,366,356 | 1/1968 | Fisher | 308/238 UX |
| 3,430,516 | 3/1969 | Pickles | 248/420 X |
| 3,461,254 | 8/1969 | Jacobs | 308/37 X |
| 3,712,573 | 1/1973 | Pickles | 248/394 |
| 3,735,645 | 5/1973 | Pickles | 74/606 |

Primary Examiner—Lawrence J. Staab
Attorney, Agent, or Firm—Whittemore, Hulbert & Belknap

[57] ABSTRACT

A seat support comprising a carriage, C-shaped slides forming opposite sides of said carriage, fixed supporting inserts in said slides on which said carriage is slidable, and elevating linkages at the front and rear of the slide for connection to a seat frame. The power mechanism includes a one-piece plastic injection molded body having integrally formed means for supporting power transmission shafts, gearing, clutches, and solenoids for selective adjustment of the seat.

6 Claims, 17 Drawing Figures

SIX-WAY ADJUSTABLE SEAT SUPPORT

BRIEF SUMMARY OF THE INVENTION

The present invention is characterized importantly by the provision of a one-piece plastic injection molded body including integrally formed means for receiving and rotatably supporting power transmission shafts and gear, and providing guide structure and housings for individually solenoid acted clutches.

Fore and aft movement of the carriage is accomplished by means of rack and pinion mechanisms, the racks being provided by elongated insert supports received within elongated generally C-shaped cross-section slides, the pinions being rotatably connected to the plastic body for longitudinal movement with the carriage.

The plastic body incorporates shaft supporting elements in the form of pairs of ears having cylindrically formed recesses constituting bearings for the shaft and an associated cover which engages the outsides of the ears after the shaft has been snapped or otherwise inserted therein.

DETAILED DESCRIPTION

Figure 2:
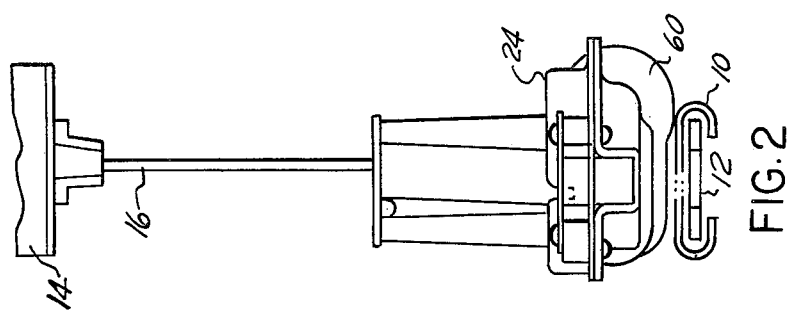
FIG. 2 is a fragmentary end view of the structure shown in FIG. 1.

The carriage 11 comprises essentially a pair of elongated slides 10 of generally C-shaped cross-section, as best illustrated in FIG. 2, and adapted to be longitudinally slidable on stationary support elements or inserts 12 suitably fixed to the floor of the vehicle. The slides 10 are rigidly interconnected and one of the slides, not illustrated in FIG. 1 but extending parallel to the slide 10, carries a reversible electric motor 14 having an output shaft 16 terminating in a drive worm 18 engageable simultaneously with worm gears 20 and 22.

Figure 3:
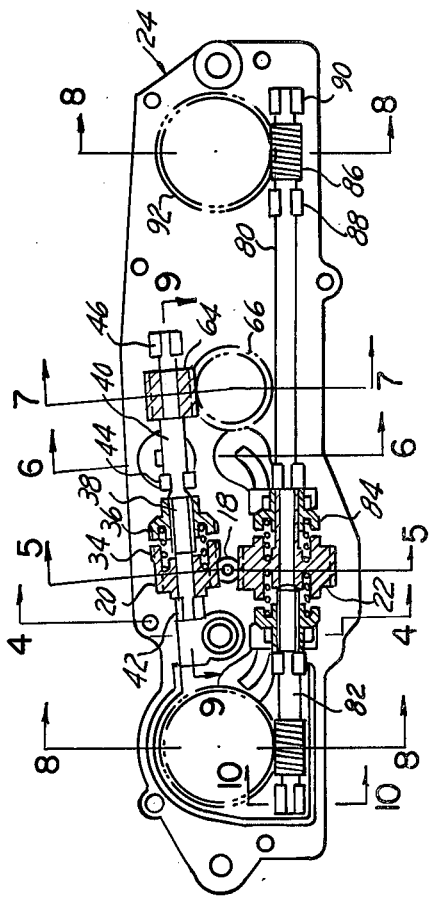
FIG. 3 is a side view of the plastic body with the cover removed but showing operating components.
Figure 4:
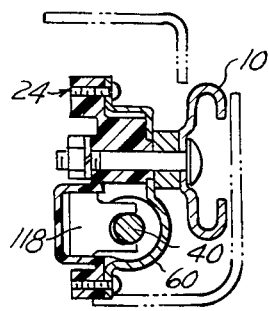
FIG. 4 is a sectional view on the line 4—4, FIG. 3.

An integral one-piece injection molded transmission support body 24 is provided and this body includes integral recesses 26 and 28 (FIG. 5) for receiving and partially supporting the worm gears 20 and 22 respectively. The body 24 includes an elongated heavy-walled rigid tubular portion 30 which receives a drive element 32 connected to the drive shaft 16 driven by the reversible electric motor 14 which is rigidly secured to the inner side of a slide member of C-shaped cross-section identical with the slide 10 previously described. Worm gear 20 is provided at one side with clutch teeth 34 cooperable with clutch teeth 36 on a shiftable clutch element 38 splined or otherwise mounted for slidable rotation on a shaft 40. The confronting sides of the worm gear 20 and the clutch element 38 are recessed to receive a coil compression spring as illustrated in FIG. 3, normally retaining the clutch element 38 displaced to the right and out of driven engagement with the clutch teeth on the worm gear 20.

Figure 10:
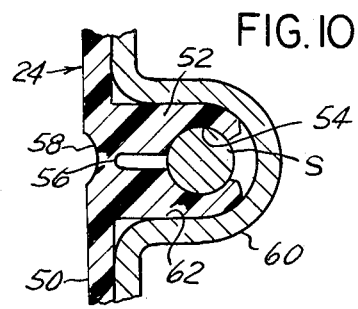
FIG. 10 is a sectional view on the line 10—10, FIG. 3.

The support body 24 is provided with three pairs of integral resilient shaft supporting fingers 42, 44 and 46. These pairs of fingers, as best seen in FIG. 10, which illustrates a separate pair of fingers projecting laterally from a flat web portion 50 of the body 24, is made up of relatively rigid finger elements 52 each of which is provided adjacent its free end with a cylindrically formed recess 54 adapted to receive and rotatably support a shaft designated at S in this Figure to represent any of the shafts supported by the body 24. The finger elements 52 are separated by the elongated slot 56 and the web portion 50 of the body 24 is preferably recessed as indicated at 58 to leave a relatively thin portion permitting flexing of the finger elements toward and away from each other. With this arrangement a shaft such as the shaft S may be pressed into the confronting cylindrical recesses in the finger elements each of which surrounds somewhat less than 180° of the periphery of the shaft. In order to complete the assembly and retain the shafts in assembled position, a separate metal cover plate element 60 is provided which is shaped to present recesses or pockets 62 adapted to fit over the outside portions of the flexible finger elements 52 and thus to retain the shaft S firmly in position.

The construction is intended to provide mechanism for moving the vehicle seat horizontally and also to selectively elevate or depress the front and rear edges. Accordingly, three separate seat adjusting mechanisms are provided.

Figure 7:
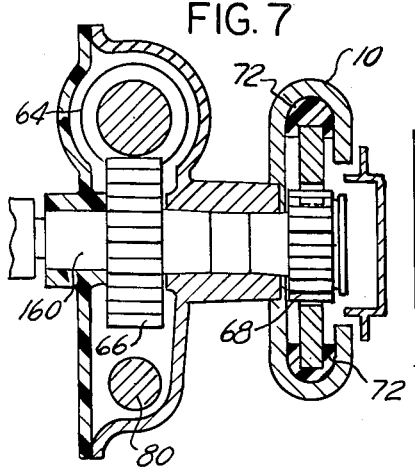
FIG. 7 is a sectional view on the line 7—7, FIG. 3.
Figure 12:
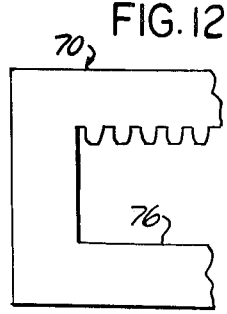
FIG. 12 is a fragmentary elevational view of the rack section shown in FIG. 7.

The mechanism and transmission for effecting fore and aft movement of the seat comprises a worm 64 in mesh with a worm gear 66, the latter having a pinion 68 secured to be driven in rotation with the worm gear. In FIG. 7 the C-shaped slide 10 is indicated as receiving the supporting insert designated 70 in FIG. 12. It will be understood that a plurality of inserts are provided and preferably include plastic bearing elements 72 which support the C-shaped slides for free sliding movement. The inserts are suitably connected to the stationary support brackets 74 (FIG. 5) by suitable means not shown.

Where the shaft or pinion 68 extends through a suitable opening in the C-shaped slide, the insert 70 is provided with an elongated slot 76 having teeth at one side thereof in mesh with the teeth of the pinion 68 and having clearance at the other side. Accordingly, as the pinion is rotated the entire carriage or slide structure is caused to move forwardly or rearwardly in a direction parallel to the C-shaped slides 10.

It will be apparent from an inspection of FIG. 3 that when the clutch 38 is shifted to the left, its teeth or dogs engage those of the worm gear 20 and accordingly, the worm gear 66 and the pinion 68 will be rotated in one direction or the other depending upon the direction of rotation of the motor 14.

The mechanism for elevating or lowering the front edge of the seat is similar to that for raising or lowering the rear edge thereof, and accordingly only one of these mechanisms will be described. Section lines 8—8 appear in FIG. 3 at two places, centrally of the front and rear seat elevating mechanism.

Figure 5:
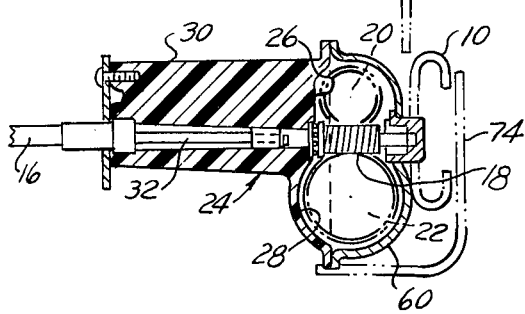
FIG. 5 is a sectional view on the line 5—5, FIG. 3.
Figure 6:
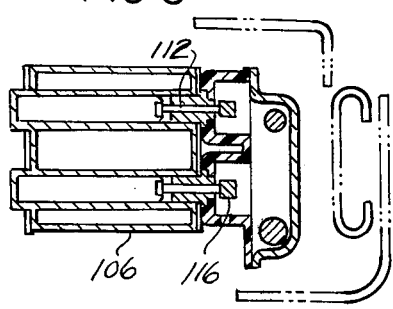
FIG. 6 is a sectional view on the line 6—6, FIG. 3.
Figure 8:
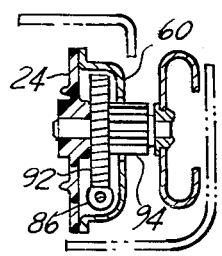
FIG. 8 is a sectional view on the line 8—8, FIG. 3.
Figure 11:
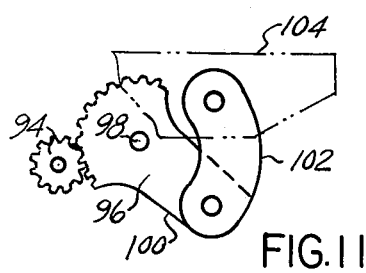
FIG. 11 is a schematic illustration of lift mechanism at one end of said carriage.

The elevating mechanism comprises the worm gear 22 previously described, which is retained in the recess 28 as best seen in FIG. 5, and which is freely rotatable with respect to a relatively long shaft 80 and a coaxial short shaft 82. Except for the length of the shafts 80 and 82, the elevating mechanism is identical except for a link included in one, and only that shown at the right of FIG. 3 will be further described. The shaft 80 has splined or otherwise connected thereto a clutch element 84 having teeth or dogs engageable with confronting teeth or dogs at the adjacent side of the worm gear 22. When the clutch element 84 is shifted to the left it drives the shaft 80 in one direction or the other depending upon the direction of rotation of the motor 14. The shaft 80 carries a worm 86 located intermediate pairs of resilient integral supporting fingers 88 and 90. A worm gear 92 is mounted for rotation on the support body 24 and, as best seen in FIG. 8 is provided with a pinion 94. As best seen in FIG. 11 the pinion 94 meshes with teeth of a sector 96 pivoted as indicated at 98 and having an arm 100, the free end of which is connected by a pivoted link 102 to one end of the seat support 104. Accordingly, as the shaft 80 is rotated through the clutch, the seat support 104 is raised or lowered through the mechanism comprising the worm, the worm gear, the pinion, the sector 96, and the arm 100 and link 102. Link 102 permits independent operation of lift arms to tilt the seat as desired.

The clutch actuating mechanism will now be described in connection with FIGS. 1, 2, 4, 6 and 9.

Figure 9:
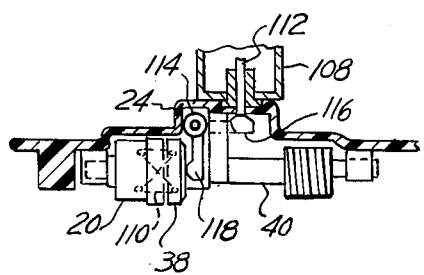
FIG. 9 is a sectional view on the line 9—9, FIG. 3.

Surrounding the lateral extension 30 on the support body 24 are three solenoids 106. The clutch actuating mechanism for all three clutches is essentially identical and is best seen in FIG. 9 where the clutch element 38 is indicated as longitudinally slidable on shaft 40 as previously described. The compression spring urging the clutch element 38 away from the worm gear 20 is diagrammatically indicated at 110. The solenoid housing 108 includes a longitudinally movable plunger 112 and pivotally mounted in a suitably formed recess in the support body 24 is a bell crank 114 having a first arm 116 engaged by the plunger 112 and a second arm 118 in the form of a fork engaging the clutch element 38 at opposite sides of its spline connection to the shaft 40.

Shafts 40, 80 and 82 are in general subject to end thrust and means are provided for acting as thrust bearings to resist axial movement of the shafts.

Each of the shafts is recessed at the end thereof toward which the axial thrust tends to move the shaft, and ball thrust bearings are inserted in the recess and extend very slightly beyond the aforesaid end of the shaft.

Figure 13:
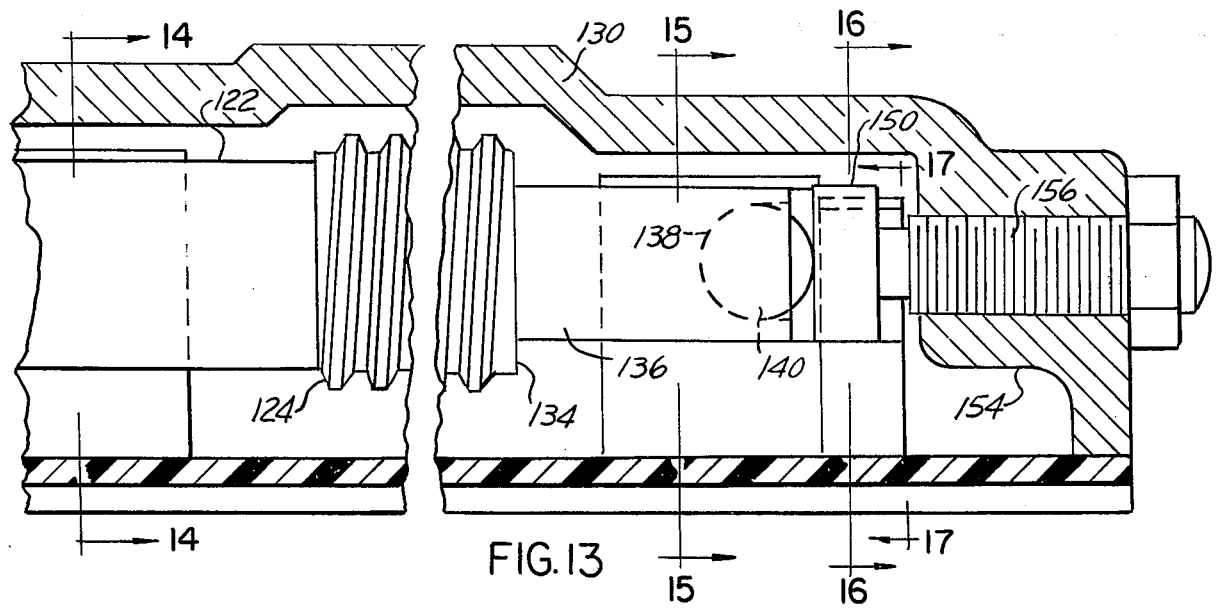
FIG. 13 is an elevational view of shaft support structure at one end of a shaft, partly in section.
Figures 14, 15:
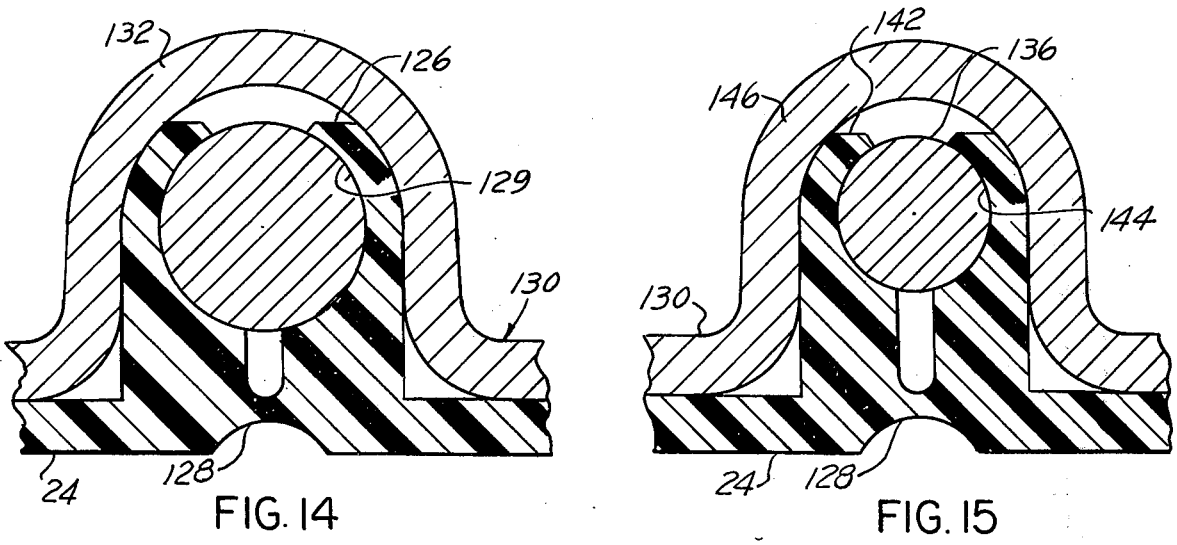
FIGS. 14-17 are enlarged sectional views on lines 14—14, 15—15, 16—16, and 17—17, FIG. 13.

In order to absorb the axial thrust of the shafts, the structure illustrated in FIGS. 13–17 is provided. In these Figures there is illustrated one end of a shaft, here designated 122, which may be the shaft 40, 80 or the like as seen in FIG. 3. The shaft carries a worm 124 and the central portion of this Figure is broken away, thus shortening the worm 124 which however may be identical with the worm 86 or the like as seen in FIG. 3. Intermediate the worm 124 and the left hand end of the shaft as seen in FIG. 13, there is a pair of shaft supporting fingers 126 as best seen in FIG. 14. The fingers 126 are substantially rigid but the free ends thereof are movable toward and away from each other primarily as a result of thinning the intermediate portion of the support body 24 as indicated at 128. In FIG. 14 the shaft 122 is shown and it will be understood that the shaft may be pressed into position intermediate the free ends of the fingers so as to be substantially embraced by the cylindrically formed portions 129 of the fingers.

A cover, here designated generally at 130, is provided which overlies all of the transmission means and actuators, best illustrated in FIG. 3, and this cover includes internally recessed domed portions 132 the inner surfaces of which are formed to closely embrace the outsides of the fingers 126. With this arrangement the shaft 122, once it has been snapped into place between the fingers 126, is positively retained against displacement. The cover 130 is formed of metal, preferably a zinc casting.

The shaft 122 is reduced as indicated at 134 to provide a reduced end portion 136 provided with a recess or socket 138 for receiving a hardened steel ball 140 constituting a portion of an end thrust bearing.

FIG. 15 is a section through the reduced portion 136 of the shaft and it will be observed that at this section the fingers 142 are correspondingly reduced in size relative to the fingers 126 and are provided with cylindrically formed confronting recesses 144 shaped to interfit with the outer surface of the reduced shaft section 136. Again, the fingers 142, after the reduced shaft section 136 has been snapped in place therebetween, are prevented from separating by a reduced domed portion 146 of the cover 130, thus serving to insure retention of the reduced shaft section between the fingers 142.

Figures 16, 17:
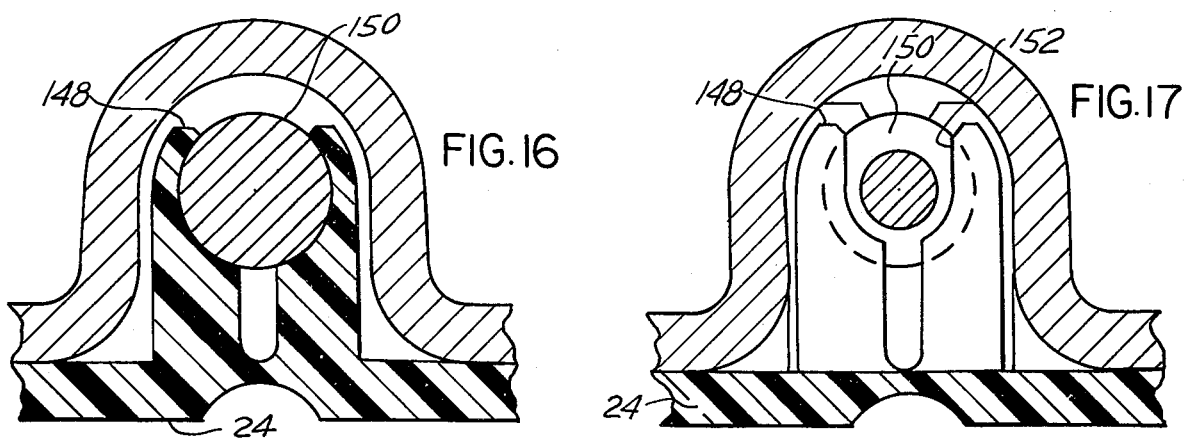

Referring now to FIG. 16 it will be noted that the cross-sectional shape of the fingers as indicated at 148, is further reduced and receive therebetween a hardened steel disc 150 which is engaged by the ball 140 and constitutes part of the thrust bearing structure.

As indicated in FIG. 17 the finger portions 148 are further reduced as indicated at 152 to form flange portions engaging peripheral edge portions of the disc 150. It will be observed in this Figure that intermediate the free ends of the finger portions 148, the central portion of the bearing disc 150 is exposed.

Referring now again to FIG. 13 it will be observed that the cover 130 has a thickened portion 154 which is internally tapped to receive a set screw 156 the end of which extends through the space between the free ends of the finger portions 142 and directly engages the steel disc 150, thus constituting a thrust bearing adequate to sustain end thrust developed by the shaft 122 when rotating to drive suitable actuating mechanism.

From the foregoing it will be observed that while the relatively movable shaft engaging fingers are readily separable to permit an intermediate portion of the shaft to be snapped in place, they are positively retained against separation after the cover 130 has been placed thereover. Also, the plastic fingers including the portions 126, 142 and 148 are not required to sustain substantial endwise thrust of the shafts, the shafts being supported by bearings including the rotatable ball received in the end socket 138, the thrust disc 150 and the adjustable set screw 156.

The carriage 11, as previously described, is provided at opposite sides thereof with the elongated slides 10 and these are rigidly interconnected by torsion bars which serve to provide a rigid carriage structure and at the same time to insure actuation of similar or identical lift and traverse mechanisms at opposite sides of the carriage.

Figure 1:
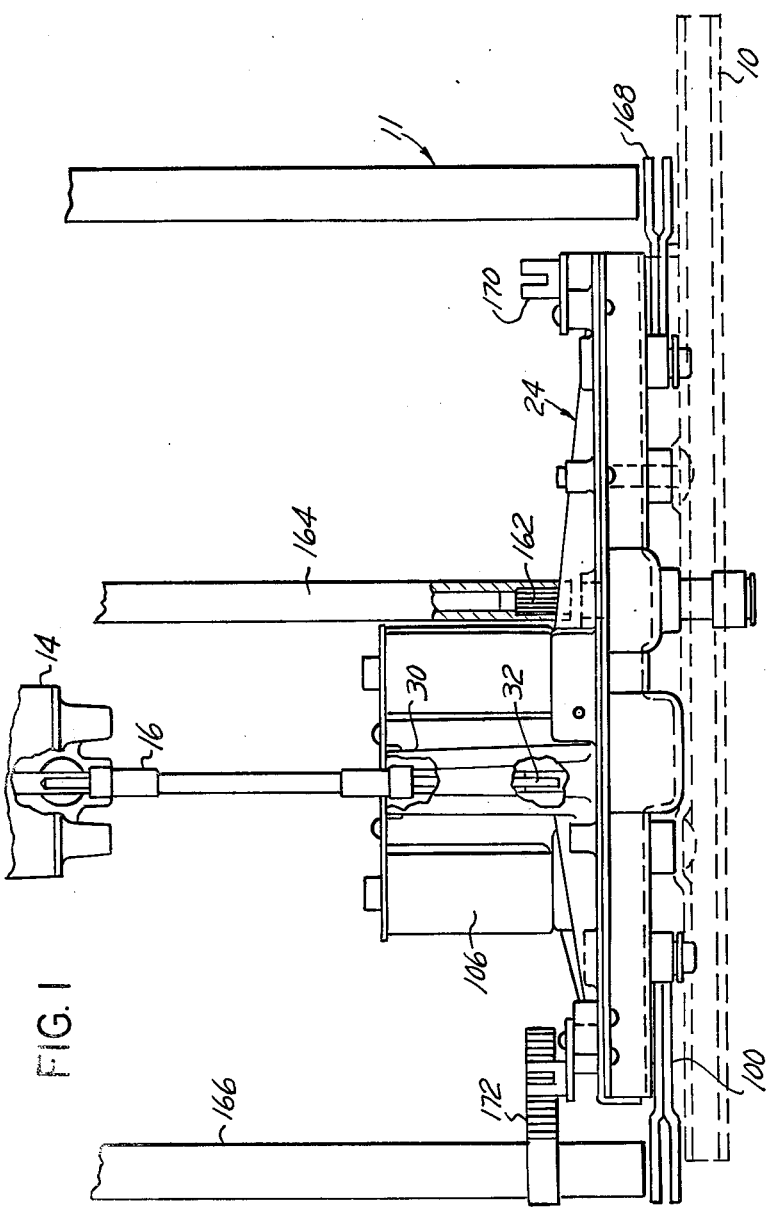
FIG. 1 is a fragmentary plan view of the mechanism including the slide, the plastic transmission supporting body, and torsion bars extending transversely to interconnect rotating elements at opposite sides of the slide.

The worm gear 66 which drives the traverse pinion 68, as best seen in FIG. 7, includes a shaft portion 160 the end of which is serrated as indicated at 162 in FIG. 1, and this serrated portion is pressed within the end of a rigid tubular torsion bar 164. At the opposite side of the carriage the torsion bar 164 is connected by similar means to a traverse pinion cooperating with a rack section formed in the elongated insert or support.

The front and rear lift mechanisms at opposite sides of the carriage are interconnected by torsion bars 166 which in turn are tubular and are freely connected to suitable projections similar to the serrated projections 132 seen in FIG. 1. These projections are in the form of pins extending through the free ends 168 of the lift arms 100. Accordingly, the torsion bars 166 are raised and lowered as the seat is raised or lowered, but serve as rigid interconnections due to the fact that they are capable of transmitting torque to the related mechanism at the opposite side of the carriage.

Preferably, the support body 24 is provided with slotted spring support arms 170 to which are connected counterbalance spring 172 to counterbalance part of the weight of the seat of the vehicle.

By the present construction a most efficient and economical use is made of a plastic material such as an acetal polymer which may be injection molded to provide substantially the entire support for the operating mechanism. Such a material is sold under the trade name Delrin and not only has adequate strength when supported and reinforced as described herein, but also has excellent low friction properties so that the shafts and rotating elements are suitably supported without the necessity for providing additional bearings or the like. The support body 24 is produced in a single injection molding operation, including the resilient fingers such as shown at 52, 42, etc. Thereafter, the operating parts including the shafts, gearing, and clutch elements are in general applied directly and are retained thereby in position, and are additionally supported by subsequent attachment of the zinc cover 60 thereto.

The use of the support body for mounting transmission mechanism coupling the motor to the lift mechanism acting between the carriage and the seat support, and the traverse mechanism acting between the carriage and the floor of the vehicle provides a very simple and economical construction characterized in part by the ease with which the transmission components can be assembled simply by pressing shaft members into position between relatively movable fingers. This construction is rendered feasible because of the use of a main input worm in constant mesh with a traverse worm gear and one or more lift worm gears, the worm gears being selectively coupled to corresponding traverse and lift shafts terminating in lift and traverse worms in mesh respectively with second lift and traverse worm gears. In the case of the traverse mechanism the second worm gear is coupled to a pinion which may be rolled along a stationary rack. In the case of the lift mechanism the lift worm is in mesh with a worm gear which drives a lift pinion which in turn meshes with a gear sector to operate a lift arm. With this construction the mechanical advantage obtained by series arrangement of two worm and worm gear combinations permits the seat adjustments to be obtained without complicated and expensive mechanism used heretofore.

What I claim as my invention is:

1. An elongated transmission support body formed in its entirety of integral injection molded plastic having at one side thereof an integral rigid tubular lateral extension for the reception of a main drive shaft, a plurality of sets of pairs of parallel spaced lift and traverse shaft support arms extending laterally from the other side of said body, said arms being substantially rigid, the junction of said arms and said support body providing for movement of the free ends of the arms of a pair toward and away from each other, cylindrically formed confronting recesses adjacent the free ends of said arms to receive and rotatably support the end portion of a shaft, means for supporting end thrust of said shaft comprising a steel disc supported between the arms of one of said pairs and engaging the end of said shaft, and a cover including a pocket in which the free ends of said arms are received, said cover having an abutment screw extending into the space between said arms and abutting the side of said disc opposite the side engaged by said shaft.

2. A support body as defined in claim 1 in which the end of said shaft adjacent said disc has a recess therein, and a hardened steel ball in said recess constituting the shaft portion engaging said disc.

3. A support body as defined in claim 2 in which said shaft has a portion of reduced diameter at its end, the confronting cylindrical recesses in said arms being of reduced diameter to accommodate the reduced shaft diameter.

4. A vehicle power seat adjuster comprising a carriage having a pair of horizontally elongated slides of generally C-shaped cross-section at opposite sides thereof,
slide supporting inserts received within said slides,
brackets fixedly supporting said inserts from the floor of the vehicle,
a reversible electric motor carried by said carriage intermediate said slides,
said carriage comprising a support body fixed to one of said slides,
said body being formed in its entirety as a unitary one-piece plastic injection molding, having as integral parts thereof a plurality of pairs of substantially rigid, relatively movable shaft supporting fingers having spaced ends having cylindrically shaped confronting shaft receiving recesses,
a main drive worm rotatably mounted on said body and connected to said motor,
a traverse worm gear rotatably mounted on said body and in constant mesh with said main drive worm,
a traverse shaft rotatably mounted on said body in a pair of shaft supporting fingers and rotatable relative to said traverse worm gear,
clutch means operable between said traverse worm gear and traverse shaft to couple said traverse worm gear and shaft together,
a second traverse worm gear rotatably mounted on said body,
a traverse worm fixed to said traverse shaft and in mesh with said second traverse worm gear,
traverse mechanism including a rotatable member fixed to said second traverse worm gear,
a lift worm gear rotatably mounted on said body and in constant mesh with said main drive worm,
a lift shaft rotatably mounted on said body and rotatable relative to said lift worm gear, clutch means operable between said lift worm gear and lift shaft to couple said lift worm gear and shaft together, a second lift worm gear rotatably mounted on said body, a lift worm fixed to said lift shaft and in mesh with said second lift worm gear, lift mechanism including a rotatable member fixed to said second lift worm gear, thrust bearing means at the end of one of said shafts, said thrust bearing means comprising a recess in the said end of said one shaft, a ball in said recess, a pair of said fingers extending beyond the end of said one shaft, a steel disc clamped between said fingers and abutting the ball at the said end of said one shaft, a metal cover extending over at least the portion of said body at which said last mentioned pair of fingers is located, said cover having an adjustable set screw extending into the space between said fingers and abutting said disc.

5. A vehicle power seat adjuster comprising a carriage having a pair of horizontally elongated slides of generally C-shaped cross-section at opposite sides thereof, slide supporting inserts received within said slides, means fixedly supporting said inserts from the floor of the vehicle, traverse mechanism for traversing said carriage longitudinally of the vehicle, including stationary rack means on said inserts and traverse pinion means mounted on said carriage in mesh with said rack means, lift mechanism comprising lift arm means pivoted to said carriage having a toothed sector means connected thereto, and lift pinion means mounted on said carriage in mesh with said toothed sector means, a reversible electric motor fixed to a side of one of said slides to extend toward the other slide, a support body fixed to the side of the other slide confronting said one slide, said body being formed in its entirety as a unitary one-piece plastic injection molding having as integral parts thereof, a plurality of sets of pairs of substantially rigid shaft supporting fingers projecting from one side of said body, said fingers being joined to said body by flexible portions permitting the free ends of said arms to move toward and away from each other, said fingers having partially cylindrical shaft supporting recesses adjacent the free ends thereof in which each set of pairs of fingers provides rotatable support for a shaft, a main driving worm rotatably carried by said body, a main drive shaft connecting said worm and motor, a traverse shaft mounted in one set of pairs of said fingers, a traverse worm gear rotatably carried by said traverse shaft on said body and in constant mesh with said main driving worm, traverse clutch means for coupling one end of said traverse shaft to said traverse worm gear, a traverse worm fixed to the other end of said traverse shaft, a second traverse worm gear rotatably mounted on said body and in mesh with said traverse worm and fixedly connected to said traverse pinion means, a lift shaft mounted in another set of pairs of said fingers, a lift worm gear rotatably carried on said body in constant mesh with said main driving worm, lift clutch means for coupling one end of said lift shaft to said lift worm gear, a lift worm fixed to the other end of said lift shaft, a second lift worm gear rotatably mounted on said body and in mesh with said lift worm and fixedly connected to said lift pinion means, and a single metal cover plate shaped to cooperate with said plastic body to define therewith enclosures for the aforesaid gearing, said plate including a multiplicity of pockets each of which is adapted to fit over one of said pairs of shaft supporting fingers to provide for initial assembly of the traverse and lift shafts in said sets of fingers followed by application of said cover plate to positively retain all of said pairs of shaft supporting fingers in shaft supporting position.

6. An adjuster as defined in claim 5 in which a pair of lift shafts are mounted in sets of pairs of shaft supporting fingers on said body, and clutch means for selectively coupling each of said lift shafts to said lift worm gear.

* * * * *